US005105202A

United States Patent [19]

Hewes

[11] Patent Number: 5,105,202

[45] Date of Patent: Apr. 14, 1992

[54] METHOD OF INCREASING THE GRAYSCALE RESOLUTION OF A NON-IMPACT LED PAGE PRINTER

[75] Inventor: James K. Hewes, Santa Clara, Calif.

[73] Assignee: Oki America, Inc., Hackensack, N.J.

[21] Appl. No.: 540,430

[22] Filed: Jun. 18, 1990

[51] Int. Cl.[5] .......................... G01D 9/00; G01D 9/42; H04N 1/23

[52] U.S. Cl. ................................ 346/1.1; 346/107 R; 358/298

[58] Field of Search ............... 346/107 R, 76 PH, 1.1, 346/134, 154; 358/298, 300, 302; 364/519; 354/4, 5

[56] References Cited

U.S. PATENT DOCUMENTS

| | | | |
|---|---|---|---|
| 4,189,752 | 2/1980 | Moe et al. | 358/298 |
| 4,679,053 | 7/1987 | Katsurai et al. | 346/1.1 |
| 4,775,896 | 10/1988 | Umeda et al. | 358/298 |
| 4,839,671 | 6/1989 | Theodoulou et al. | 346/154 X |
| 4,856,920 | 8/1989 | Sanders, Jr. | 346/76 L |
| 4,896,168 | 1/1990 | Newman et al. | 346/107 R |

*Primary Examiner*—Benjamin R. Fuller
*Assistant Examiner*—David Yockey
*Attorney, Agent, or Firm*—Panitch, Schwarze, Jacobs & Nadel

[57] ABSTRACT

A method of improving the grayscale resolution of a bi-level, light emitting diode type page printer includes increasing the frequency at which printing data is entered into an LED head and correspondingly increasing the frequency at which the LEDs are actuated. The rate at which an image drum is moved past the LEDs is decreased and the feed rate of paper flowing through the printer is correspondingly decreased. The duration of each actuation of the LEDs is decreased to produce dots on the image drum and on the paper which are of a small size.

7 Claims, 2 Drawing Sheets

METHOD OF INCREASING THE GRAYSCALE RESOLUTION OF A NON-IMPACT LED PAGE PRINTER

BACKGROUND OF THE INVENTION

The present invention relates generally to non-impact page printers and, more particularly, to a method for increasing the grayscale resolution of a non-impact, light emitting diode type page printer.

The tremendous growth in the computer industry has resulted in a corresponding growth in computer peripherals, particularly low cost desk top page printers, which are used to provide a paper or hard copy of the output from a computer. Such printers may be employed for desk top publishing, typeset proofing, normal business or home printing or in any other field where low cost, high quality images are required. As computer speeds increased, it became apparent that traditional impact-type printers were not able to operate at the speeds required to keep up with the computer. Some printers utilize a buffer system to receive and temporarily hold the information from the computer to be printed until such time as the impact-type printer could "catch up" and print all of the information. As an alternative, a variety of non-impact printers were developed. The technologies involved in such non-impact printers include laser printers, ink jet printers and light emitting diode (LED) printers, as well as a variety of other less well known printer technologies. All of these technologies are capable of operating at speeds which are generally higher than the speeds attainable by impact-type printers.

A typical non-impact page printer which employs LED technology operates by lighting a series of LEDs, generally along a single row for a short time, in accordance with a prescribed pattern, in order to produce one line of charge comprising a series of small sized dots on an image drum which, in turn, imposes the dots on a sheet of paper within the printer. The pattern of the dots is carefully controlled so that as the image drum and the paper move and the LEDs are lit or flashed a plurality of times, the dots eventually form printed images which generally include characters, such as alphanumeric characters. A typical LED type non-impact page printer is capable of placing dots on the moving page at a resolution of about 300 dots per inch in either the vertical or the horizontal direction, or approximately 90,000 dots per square inch of paper. Printers of this type are typically referred to as dot matrix printers and are generally well known in the art and commercially available from a variety of manufacturers, including Okidata, the assignee of the present application.

While non-impact LED page printers of the type described above are well suited for the printing of many images, including standard alphanumeric characters of a type which would typically be used in conjunction with the printing of textual material, such as letters, brochures, etc., as well as many other applications, such printers are not particularly well suited to printing applications which require a high degree of grayscale resolution to maintain good quality. Quality appears poor when the eye can notice the staircase on the periphery of an alphanumeric character or the individual component dots in a shade of gray and appears to be good when these components cannot be resolved. Such applications include printing, photographs, some graphical materials and the like.

The present invention relates to a method of increasing the grayscale resolution of a non-impact LED type page printer to a level which permits the printing of good quality images utilizing standard, state-of-the-art equipment. The method of the present invention can be easily employed for the purpose of retrofitting existing LED page printers to provide such increased resolution and good quality images at a relatively low cost.

SUMMARY OF THE INVENTION

Briefly stated, the present invention comprises a method of improving the grayscale resolution of a bi-level, light emitting diode (LED) page printer which employs a fixed number of LEDs having a predetermined horizontal spacing along a single row within an LED head. LEDs within the row are selectively actuated at a predetermined actuation frequency and for a predetermined actuation duration in accordance with printing data entered into the LED head at a predetermined data entry frequency for controlling the actuation of individual LEDs of the row to impose a series of dots of a predetermined size upon a movable image drum being moved past the LED head at a predetermined rate. The image drum transfers the series of dots onto a sheet of paper being moved through the printer at a predetermined feed rate. The method comprises the steps of increasing the frequency at which the printing data is entered into the LED head and correspondingly increasing the frequency at which the LED row is actuated. The rate at which the image drum is moved past the LED head is decreased to a rate which is less than the predetermined rate and the paper feed rate is correspondingly decreased to a feed rate which is less than the predetermined feed rate. The duration of each actuation of the LED row is decreased to be less than the predetermined duration to produce dots on the image drum and on the paper which are smaller in size than the predetermined dot size.

BRIEF DESCRIPTION OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It is understood, however, that the invention is not limited to the precise arrangements and instrumentalities shown. In the drawings.

DESCRIPTION OF PREFERRED EMBODIMENT

Figure 1:
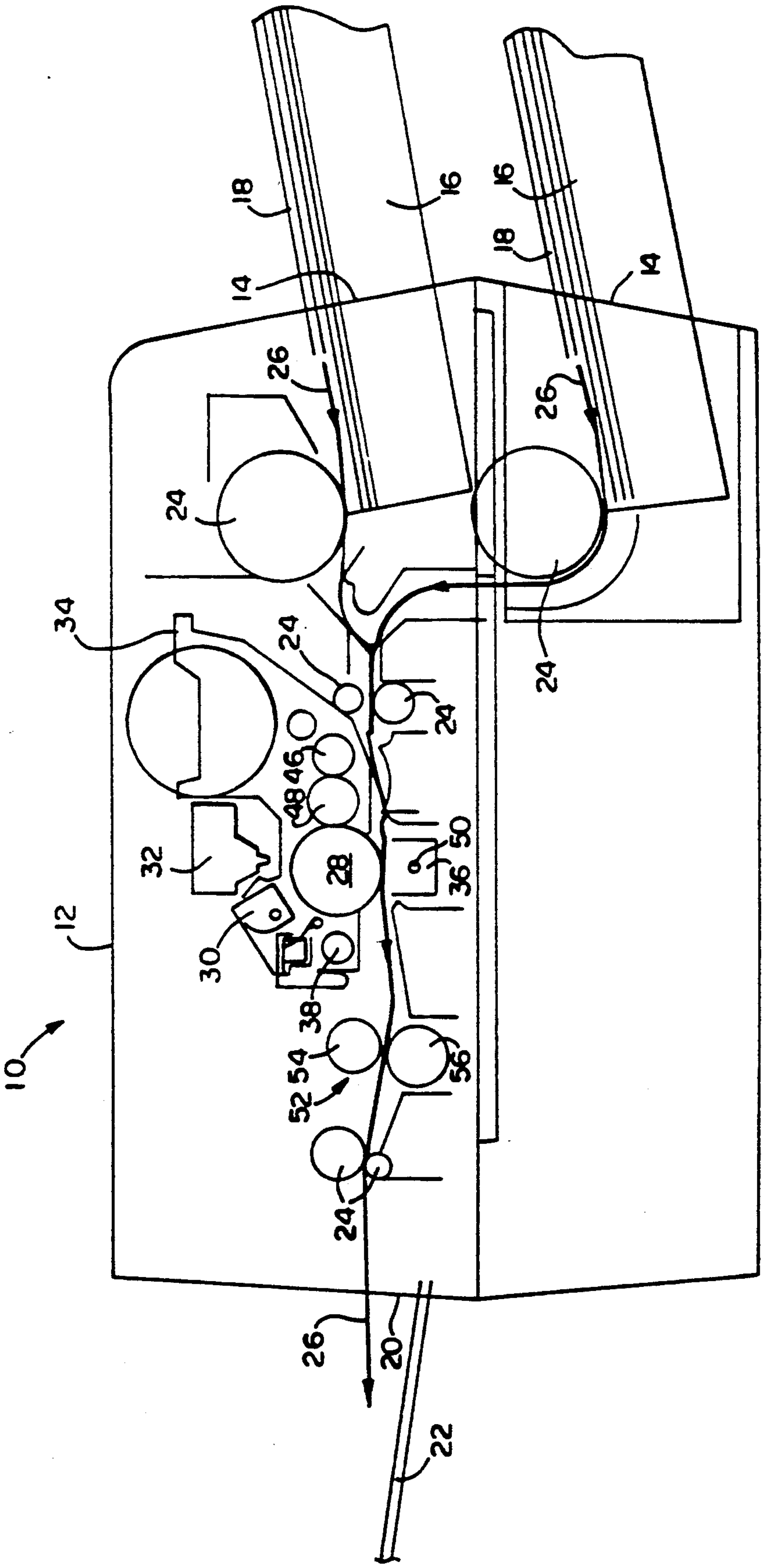
FIG. 1 is a schematic representation of the functional aspects of a typical non-impact, light emitting diode type page printer.

Referring to the drawings wherein like numerals indicate like elements throughout the several figures, there is shown in FIG. 1 a schematic representation of the functional aspects of a non-impact LED type page printer 10. The page printer 10 which is schematically depicted in FIG. 1 is typical of such non-impact page printers and is commercially available from Okidata Corporation as OkiLaser Model No. OL800. Complete details of the entire structure and operation of the OL800 page printer 10 are not necessary for a complete understanding of the present invention and, in any event, are available from the manufacturer.

The page printer 10 is comprised of a generally box-like, generally enclosed housing 12 which surrounds and contains the various operational components which will hereinafter be described. The housing 12, in the present embodiment, is formed of a suitable, generally rigid material such as metal or plastic and includes a pair of generally slot-like openings 14 on one side (the right side when viewing FIG. 1) which are adapted for receiving a pair of paper holding cassettes or paper tray units 16. The paper cassettes 16 are employed for holding a paper supply comprising a plurality of individual sheets of paper 18 and for positioning and orienting the paper sheets 18 so that the sheets can be individually fed into the housing 12 in a manner well known in the art which will hereinafter be briefly described. In typical operation of the page printer 10, each paper cassette 16 holds a different size paper, for example, the top paper cassette may hold paper sheets which are $8\frac{1}{2}\times 11$ inches and the bottom paper cassette may hold paper sheets which are $8\frac{1}{2}\times 14$ inches.

The housing 12 further includes a generally slot-like paper outlet opening 20 and a paper receiving tray 22. In the embodiment shown in FIG. 1, the paper outlet opening 20 and the paper receiving tray 22 are located o· the side of the housing 12 which is opposite from the paper inlet openings 14 and paper cassettes 16. In other embodiments, these features may be at other locations. Once a sheet of paper 18 has been suitably imprinted, it is ejected from the housing 12 through the paper outlet opening 20 and is received and retained by the paper receiving tray 22 in a manner which is well known in the art.

The housing 12 further includes a plurality of rollers 24 at spaced locations which are employed for removing the individual paper sheets 18 from the paper cassettes 16, for moving the individual paper sheets 18 through the housing 12 during the printing process, and for ejecting the printed paper sheets 18 through the paper outlet opening 20 and onto the paper receiving tray 22. The paper sheets 18 move generally along the flow path indicated by reference numeral 26. The rollers 24 are driven by a drive means which includes one or more electric motors (not shown) and appropriate drive linkage means, such as gears, drive belts, etc. (not shown) in a manner which is well known in the art. The page printer 10 further includes a plurality of sensors (not shown) positioned at spaced locations along the paper flow path 26 for confirming the presence of a sheet of paper 18 at a particular paper path location at particular times in order to properly effectuate the timing of the printing process.

The principal component of the page printer 10 is an image drum 28. In the present embodiment, the image drum 28 is formed of an aluminum base (not shown) which is coated with a plurality of layers (not shown) including an under layer, a carrier generation layer, and a carrier transfer layer. The image drum 28 is moved or rotated at a predetermined rate in a clockwise direction, when viewing FIG. 1. The image drum 28 is employed for initially receiving an electrical charge and thereafter being irradiated to form a latent image to be printed on a paper sheet. Further details of the structure and operation of the image drum 28 are available from the manufacturer and are not necessary for a complete understanding of the present invention.

Figure 2:
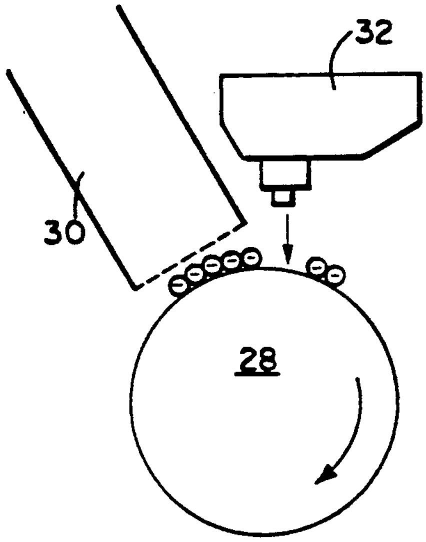
FIG. 2 is an enlarged side elevational schematic diagram of a portion of the page printer shown in FIG. 1 illustrating the actuation of the LED head.

Surrounding the image drum 28 are a charging unit 30, an LED head 32, a toner cartridge 34, a transcribing unit 36, and a cleaning unit 38. The charging unit 30 applies a high voltage, in the present embodiment negative 6000 volts D.C., to a charging device, such as a charge wire (not shown), which creates a corona discharge of negative ions to the surface of the portion of the image drum 28 passing in the vicinity of the charging unit 30, as shown in FIG. 2. The aluminum base of the image drum 28 is positively charged, thereby allowing the negative charges from the charging unit 30 to be retained on the surface of the image drum 28. Control means (not shown) are provided for controlling the quantity of negative ions discharged to the surface of the image drum 28 and for maintaining an even distribution of the static negative charges to provide a potential of about negative 700 volts along the surface of the image drum 28 as the surface passes the charging unit 30.

Figure 4:
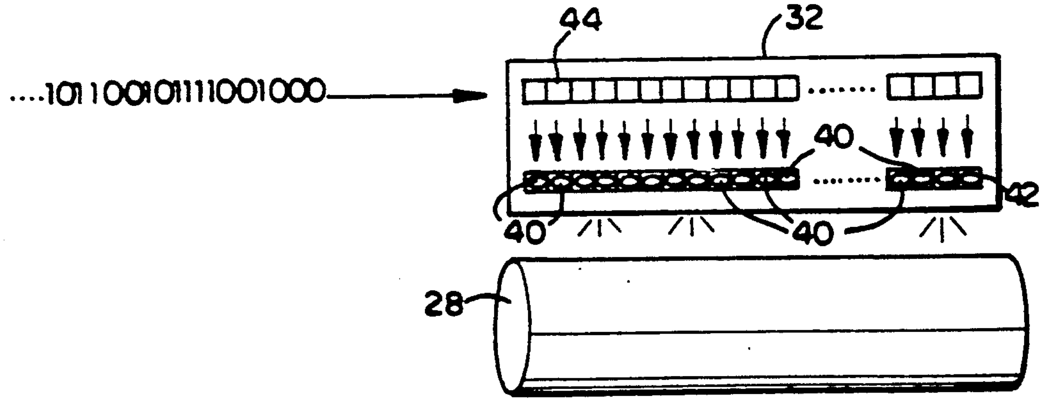
FIG. 4 is a front elevational schematic diagram of a portion of the page printer of FIG. 1 illustrating printing data being entered into the LED head.

After passing by the charging unit 30 and receiving the negative charges on its surface, the image drum 28 rotates past the LED head 32. The LED head 32 includes a plurality of individual LEDs 40 at spaced locations along a single, generally horizontal row 42. In the presently preferred embodiment, the LED row 42 contains 2,560 individual LEDs 40, each LED being of a predetermined size and the LEDs having a predetermined spacing to provide 300 individual LEDs per inch along the LED row 42, as best illustrated in FIG. 4. The LED head 32 further includes a binary shift register 44 (see FIG. 4) of a type well known in the art which includes a single bit position for each of the 2,560 individual LEDs 40 of the LED row 42. Printing data from a printing controller (not shown) is entered into the LED head 32 by serially shifting into the shift register 44 a series of binary digits (one's or zero's) for controlling the actuation of the individual LEDs 40 in a manner well known in the art. Thus, in the presently preferred embodiment, if the bit position within the shift register 44 contains a "zero" the corresponding LED 40 is not actuated and if a bit position within the shift register 44 contains a "one" the corresponding LED 40 is actuated. In the preferred embodiment of the page printer 10, the printing data is entered into the shift register 44 at a frequency of about 1.84 MHz and the LED row 42 is actuated to illuminate the LEDs 40 having a one in the corresponding bit position of the shift register 44 once every 1.67 milliseconds. In addition, in the printer 10 the LED row 42 is actuated for a duration of approximately 34.7 microseconds.

Figure 3:
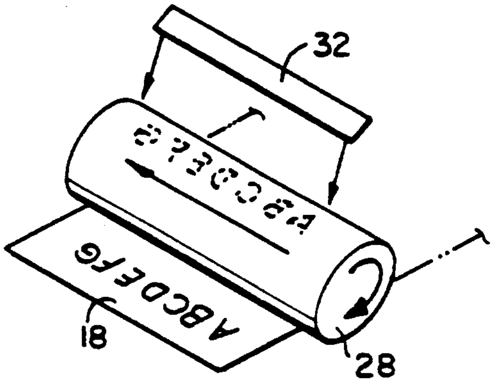
FIG. 3 is a perspective schematic diagram of the portion of the page printer shown in FIG. 1 also illustrating the actuation of the LED head to produce dots on the image drum.

As best shown in FIG. 2, light emitted from an actuated LED of the LED row 42 is radiated to the negatively charged surface of the image drum 28 causing the electrical resistance of the exposed portion of the image drum surface to lessen, thereby allowing charges to escape and forming a generally circular dot. Each actuation of the LEDs in the Led row 42 produces one line of print charge on the image drum 28. The individual dots from multiple lines of print charge cooperate to form a latent image on the surface of the image drum 28 with a potential which is lower (about negative 100 volts) than the remainder of the image drum surface in a manner which is generally well known in the art. By controlling the actuation of the individual LEDs 40 in the LED row 42, alphanumeric characters, as illustrated in FIG. 3, or virtually any other type of latent image, can be formed on the surface of the image drum 28.

After the series of dots forming the latent image are imposed upon the image drum 28, the drum rotates to the toner cartridge 34. The toner cartridge 34 includes a supply of negatively charged toner (not shown), a toner feed roller 46 and a developer roller 48. Toner is supplied to the toner feed roller 46 which engages and supplies toner to the developer roller 48. The developer roller 48 correspondingly rotates and engages the image drum 28 to apply toner to the outer surface of the image drum 28. The negatively charged toner is attracted to the latent image (low potential) on the surface of the image drum 28 to convert the latent image to a visible toner image.

The image drum 28 with the toner image thereon rotates to the transfer or transcribing unit 36. At the transcribing unit 36, the image drum 28 engages a sheet of paper 18. The transcribing unit 36 includes a charging wire 50 which extends along the length of the image drum 28. The charging wire 50 receives a high positive voltage of approximately 5000 volts and, through corona discharge, imposes a positive charge on the paper sheet 18 on the side of the paper which is not in engagement with the image drum 28. The positive charge on the paper sheet 18 attracts and holds the toner from the toner image on the surface of the image drum 28, thereby transferring the toner image to the paper sheet 18.

After the toner image is transferred to the paper sheet 18, the charging drum 28 continues to rotate to the cleaning unit 38. At the cleaning unit, residual toner remaining on the surface of the image drum 28 is scraped off by a cleaning blade (not shown) and is returned to the toner cartridge 34 for recycling and reuse. The image drum 28 then rotates to the charging unit 30 and the entire process is thereafter repeated.

The sheet of paper 18 with the image imposed thereon is moved to a fusing unit 52, where it passes under heat and pressure between a hot roller 54 and a pressure roller 56. Preferably, the hot roller 54 is Teflon coated and contains a regulated heater (not shown) which maintains the hot roller 54 at a temperature of approximately 150° Celsius. The pressure roller 56 is spring loaded to provide a pressure of approximately 3 Kg. Movement of the paper sheet 18 through the fusing unit results in the fusing of the toner image to the paper in a manner well known in the art. Thereafter, the paper is ejected from the housing 12 in the manner described above.

The page printer 10, as previously indicated, is a commercially available printer. When utilizing the page printer 10 the paper feed rate is at about eight pages per minute and the image drum 28 rotates at a corresponding rate of eight pages per minute, or approximately two inches per second. As previously indicated, the printing information is shifted into the shift register 44 at a frequency of about 1.84 MHz and the LED row 42 is actuated once every 1.67 milliseconds for a duration of approximately 34.7 microseconds. Operation of the page printer 10 in this manner provides the actuation of the LED head 32 at a rate of 300 times per inch of image drum rotation and paper feed to produce a printed image having a vertical resolution of 300 dots per inch and a horizontal resolution (due to the number and spacing of the individual LEDs) of 300 dots per inch at a rate of eight pages per minute. Although this type of resolution is acceptable for many printing applications, it is inadequate in other applications, particularly applications in which it is necessary to represent 16 gray levels in order to provide an image of good quality. The present invention provides a method of increasing the grayscale resolution of the above-described page printer 10 and other such printers without changing the structure of any of the hardware components. Employing the method of the present invention the resolution of the above-described page printer 10 can be enhanced to provide an addressable vertical resolution of 1200 dots per inch or more. Because the size of the LED row 42 is fixed, the horizontal resolution must be maintained at 300 dots per inch. However, the enhanced vertical resolution effectively increases the grayscale resolution of the page printer 10 to provide acceptable print quality. Because the present invention does not involve changing any of the hardware of the page printer 10, the page printer 10 may operate either in the manner described above with the 300×300 dots per inch resolution or may be selectively operated on a page-by-page basis by the user at up to the enhanced 300×1,200 dots per inch resolution.

The present invention involves extending the vertical resolution in the present embodiment to 1,200 dots per inch by making changes to the software and/or firmware (not shown) which controls the operation of the page printer 10. Specifically, the present invention comprises increasing the frequency at which the printing data is entered into the shift register 44 of the LED head 32. In addition, the frequency at which the LED row 42 is actuated is correspondingly increased. In the presently preferred embodiment, the frequency at which the printing data is entered into the shift register 44 is tripled from about 1.84 MHz to about 5.53 MHz and the frequency of the actuation of the LED row 42 is increased from a rate of actuation of once every 1.67 milliseconds to about once every 0.84 millisecond. In this manner, the LED head 32 is actuated at about 600 times per inch of image drum rotation and paper feed, and the printing information is therefore imposed upon the image drum 28 at a faster rate.

In the presently preferred embodiment, in order to impose more printing information onto the image drum 28, the rate at which the image drum 28 is moved past the LED head 32 is decreased to a rate which is less than the predetermined rate (eight pages per minute) discussed above in connection with the printer 10. The paper feed rate is also correspondingly decreased to a feed rate which is less than the predetermined feed rate (eight pages per minute) discussed above. In the presently preferred embodiment, both the image drum 28 and the paper feed rate are decreased by one-half, from about eight pages per minute to about four pages per minute, thus permitting the LED head 32 to be actuated at a rate of 1,200 times per inch of image drum rotation and paper feed. Thus, with these modifications, the page printer 10 can provide a vertical resolution of 1,200 dots per inch.

In addition, to further facilitate imposing more printing information onto the image drum 28, the duration of each actuation of the LED row 42 is decreased so that it is less than the predetermined duration described above in connection with the page printer 10. In the presently preferred embodiment, the duration of each actuation of the LED row 42 is decreased by a factor of six from about 34.7 microseconds to about 5.8 microseconds. The effect of decreasing the duration of each actuation of the LED row 42 is that the individual dots produced on the image drum 28 and on the paper sheet 18 are smaller in size than the dots produced through operation of the page printer 10 in the manner described above.

By making all of the above-described changes to the operation of the page printer 10, the number of dots per inch in the vertical direction may be increased from 300 dots per inch to 1,200 dots per inch, each of the dots being smaller than dots generated at the 300 dots per inch rate. As discussed above, these modifications to the operation of the page printer 10 result in a significant increase in the grayscale resolution of the page printer 10.

It should be appreciated by those skilled in the art that while certain specific changes to the operation of the page printer 10 have been disclosed, the present invention is not limited to the specific changes made. For example, the rate of movement of the image drum 28 and the paper feed rate may be decreased by a factor other than one-half of the predetermined or normal rate. Correspondingly, the duration of actuation of the LED row 42 may be changed by some factor other than six in order to provide dots of a different size. Finally, the frequency at which the printing data is entered into the shift register 44 of the LED head 32 and/or the frequency at which the LED row 42 is actuated may be increased by factors other than three and two, respectively.

It should also be appreciated that some, but not all, of the changes could be made to the operation of the page printer 10 to improve resolution to less than 1,200 dots per inch. For example, the image drum speed and paper feed rate could remain constant while the other changes are made. Similarly, the actuation duration could be maintained constant while the other changes are made.

From the foregoing description, it can be seen that the present invention comprises a method of improving the grayscale resolution of a bi-level, light emitting diode type non-impact page printer. It will recognized by those skilled in the art that changes may be made to the above-described embodiment without departing from the broad inventive concepts of the invention. It is understood, therefore, that this invention is not limited to the particular embodiment disclosed, but it is intended to cover all modifications which are in the scope and spirit of the invention as defined by the appended claims.

I claim:

1. A method of improving the grayscale vertical resolution of a bi-level, light emitting diode (LED) type non-impact page printer which empolyes hardward components including a fixed number of LEDs having a predetermined horizontal spacing along a single row within an LED head without changing the number and spacing of the LEDs and without making other changes to the hardward components of the printer, the LEDs within the row being selectively actuated at a predetermined actuation frequency and for a predetermined actuation duration in accordance with printing data entered into the LED head at a predetermined data entry frequency for controlling the actuation of individual LEDs of the LED row to directly impose a series of dots of a predetermined size upon a movable image drum being moved past the LED head at a predetermined rate, the image drum directly transferring the series of dots onto a sheet of paper being moved through the printer at a predetermined feed rate comprising the steps of:

increasing the frequency at which the printing data is entered into the LED head and increasing the frequency at which the LED row is actuated;

decreasing the rate at which the image drum is moved past the LED head to a rate which is less than the predetermined rate and correspondingly decreasing the paper feed rate to a feed rate which is less than the predetermined feed rate; and decreasing the duration of each actuation of the LED row to be less than the predetermined duration to produce dots on the image drum and on the paper which are smaller in size than the predetermined dot size.

2. The method as recite din claim 1, wherein the frequency at which the LED row is actuated is correspondingly doubled and the frequency at which the printing data is entered into the LED head is at least doubled.

3. The method as recited in claim 1, wherein the rate at which the image drum is moved past the LED head is decreased to a rate which is one-half of the predetermined rate and the paper feed rate is decreased to one-half of the predetermined feed rate.

4. The method as recited in claim 1, wherein the duration of each actuation of the LED row is decreased by about a factor of 6.

5. A method of improving the grayscale vertical resolution of a bi-level, light emitting diode (LED) type non-impact page printer which employs hardward components including 2,560 LEDs along a single row within an LED head without changing the number and spacing of the LEDs and without making other changes to the hardward components of the printer, the LED row being actuated at a predetermined frequency and for a duration of 34.7 microseconds in accordance with printing data which is entered into the LED head at a predetermined frequency for controlling the actuation of individual LEDs of the LED row to directly impose a series of dots of a predetermined size upon a movable image drum being moved past eh LED heat at a predetermined rate, the image drum directly transferring the series of dots onto a sheet of paper moving through the printer at a predetermined feed rate of eight pages per minute, the method comprising the steps of:

doubling the frequency at which the LED row is actuated and at least doubling the frequency at which the printing data is entered into the LED head;

decreasing the rate of movement of the image drum and the feed rate of the paper to four pages per minute; and decreasing the duration of each actuation of the LED row to 5.8 microseconds to product dots on the paper which are smaller in size than the predetermined dot size.

6. A method of improving the grayscale vertical resolution of a bi-level, light-emitting diode (LED) type non-impact page printer which employs hardware components including a fixed number of LEDs having a predetermined horizontal spacing along a single row within an LED head without changing the number and spacing of the LEDs and without making other changes to the hardward components of the printer, the LED row being actuated at a predetermined frequency and for a predetermined duration in accordance with printing data entered into the LED head at a predetermined frequency for controlling the actuation of individual LEDs of the LED row to directly impose a series of dots of a predetermined size upon a movable image drum being moved past eh LED heat at a predetermined feed rate, the image drum directly transferring the series of dots onto a sheet of paper moving through the printer at a predetermined feed rate, comprising the steps of:

increasing the frequency at which the printing data is entered into the LED head and correspondingly increasing the frequency at which the LED row is actuated;

decreasing the rate at which the image drum is moved pas the LED heat to a rate which is less than the predetermined feed rate; ad decreasing the feed rate of the paper to a feed rate which is less than the predetermined feed rate.

7. A method of improving the grayscale vertical resolution of a bi-level, light emitting diode (LED) type non-impact page printer which employs hardward components including a fixed number of LEDs having a predetermined horizontal spacing along a single row within an LED head without changing the number and spacing of the LEDs and without making other changes to the hardward components of the printer, the LED row being actuated at a predetermined frequency and for a predetermined duration in accordance with printing data entered into the LED head at a predetermined frequency for controlling the actuation of individual LEDs of the LED row to directly impose a series of dots of a predetermined size upon movable image drum being moved pas the LED head at a predetermined rate, the image drum directly transferring the series of dots onto a sheet of paper moving through the printer at a predetermined feed rate, comprising the steps of:

increasing the frequency at which the printing data is entered into the LED head and correspondingly increasing the frequency at which the LED row is actuated; and decreasing the duration of each actuation of the LED row to be less than the predetermined duration to produce dots on the paper which are smaller in size than the predetermined dot size.

* * * * *